United States Patent [19]

Piereder

[11] 4,188,767
[45] Feb. 19, 1980

[54] APPARATUS FOR PORTIONING AND ENCASING MEAT PRODUCTS

[75] Inventor: Ludwig Piereder, Pierrefonds, Canada

[73] Assignee: Piereder Machinery Ltd-Machinerie L. Iereder Ltee, Montreal, Canada

[21] Appl. No.: 914,995

[22] Filed: Jun. 13, 1978

[51] Int. Cl.² .............................. B65B 3/14; B65B 3/16
[52] U.S. Cl. .................................... 53/122; 17/39; 17/41; 53/138 A
[58] Field of Search ............... 53/122, 138 A; 17/35, 17/38, 39, 41; 222/332, 354, 56

[56] References Cited

U.S. PATENT DOCUMENTS

| | | | |
|---|---|---|---|
| 3,052,915 | 9/1962 | Moller | 17/39 X |
| 3,380,226 | 4/1968 | Tracy | 53/138 A |
| 3,587,204 | 6/1971 | George | 53/138 A |
| 3,733,653 | 5/1973 | Javaloy et al. | 17/35 |
| 3,890,922 | 6/1975 | Nordenholt | 222/334 X |

FOREIGN PATENT DOCUMENTS 179498  9/1954  Austria ........................................... 17/41

*Primary Examiner*—Travis S. McGehee
*Attorney, Agent, or Firm*—Alan Swabey; Robert Mitchell; Melvin Sher

[57] ABSTRACT

This invention relates to an apparatus for automatically providing a predetermined portion of a meat product in a casing, and for automatically closing and clamping closed the open end of the casing. The apparatus includes a portioning piston and cylinder arrangement including a second piston and cylinder arrangement which regulates the speed of the first piston and cylinder arrangement. Meat product is fed to the portioning cylinder from a source of the meat product by a valve arrangement, and the valve arrangement then passes the meat from the portioning cylinder to a horn. The portioned product is inserted in a casing whose end is automatically clamped closed after the complete portion is inserted in the casing.

8 Claims, 6 Drawing Figures

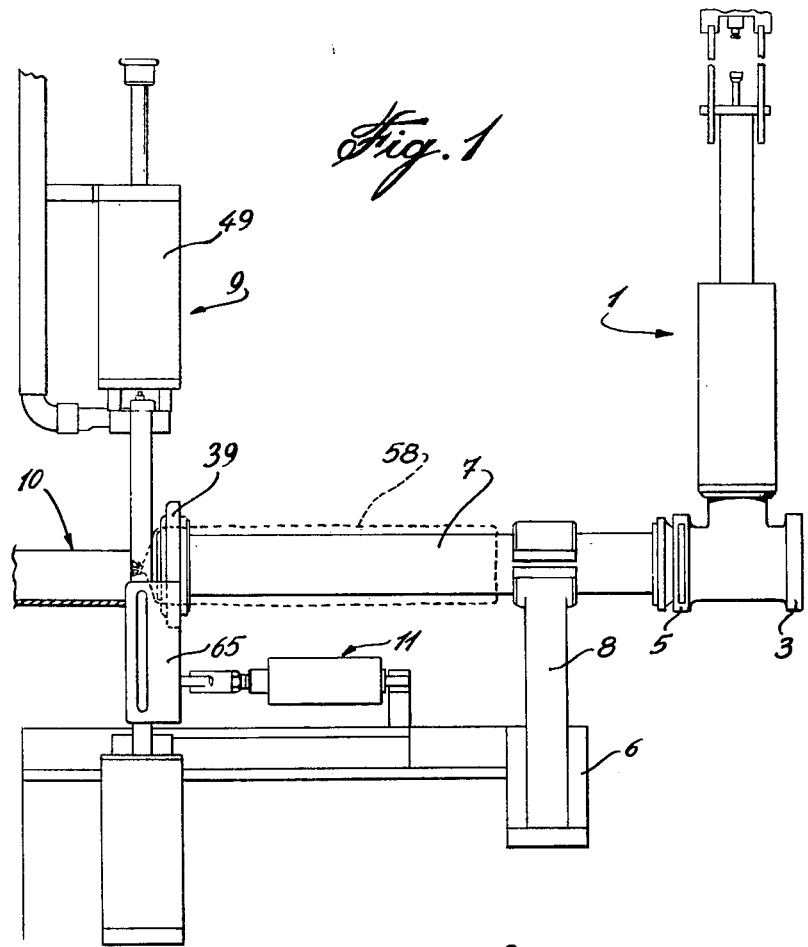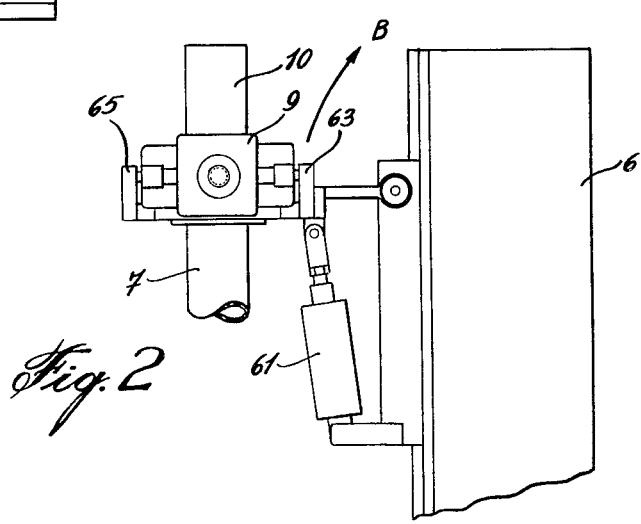

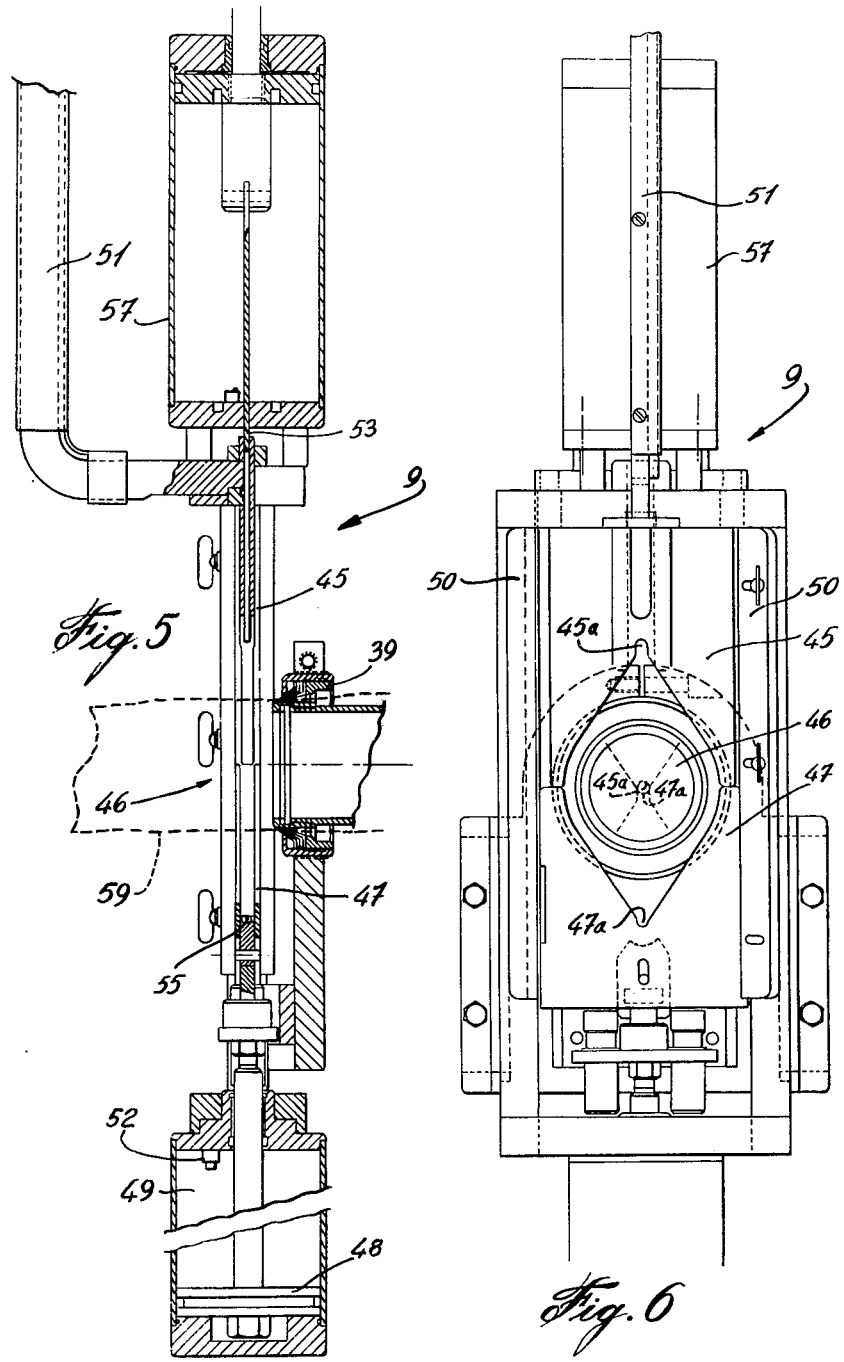

APPARATUS FOR PORTIONING AND ENCASING MEAT PRODUCTS

BACKGROUND OF THE INVENTION

1. Field of the Invention

This invention relates to an apparatus for portioning and encasing whole meat products which have not been ground or emulsified. More specifically, this invention relates to such an apparatus wherein the portioning and the casing closure steps are machine performed.

2. Statement of the Prior Art

In the packaging of whole muscle meat products, the products are transferred from a feed means, such as a hopper, to a packaging station by way of, for example, meat pumps. At the packaging station, the meat product is encased in a suitable casing, and it is important that the correct weight of the product be included in each package. Having an overweight situation is costly to the packaging company, and having an underweight situation is unfair to the ultimate purchaser.

Presently, a great part of the portioning and casing process is manually performed. This is costly, slow and inefficient. In addition, accuracy is poor, so that the packages do not always contain the correct weight.

In addition, the product is normally fed to the casing via a horn. With present systems, a portioned product is not separated from its previous or following portion until it is in the casing. This makes it very difficult to close the casing, as unseparated product gets in the way.

SUMMARY OF THE INVENTION

It is therefore an object of the invention to mechanize at least part of the portioning and encasing of meat products process.

It is a more specific object of the invention to provide an apparatus which mechanizes at least a part of the portioning and encasing process.

It is an even more specific object of the invention to provide such an apparatus which automatically portions the meat product to insure the correct weight in each package.

It is a further object of the invention to provide an apparatus in which the casing closure step is automatically performed.

It is a still further object of the invention to provide such an apparatus which includes a novel speed control means.

It is a still further object of the invention to provide such an apparatus which includes means for preventing pieces of meat from falling out of the open end of a storage horn.

It is a still further object of the invention to provide a system including means for separating portions before the portions are inserted in the casing.

In accordance with the invention, an apparatus for automatically providing a predetermined portion of a meat product, received from a source, in a casing, comprises:

a portioning means;
a storage horn;
valve means for passing said product from said source to said portioning means, and, subsequently, from said portioning means to said horn.

Said portioning means may comprise;

a first chamber with an adjustable effective volume;
a rod and first piston arrangement in said chamber said first piston being pushed upwardly by meat entering said chamber; and
means for forcing said first piston downwardly when said effective volume of said first chamber is filled with said meat product to thereby force said meat product out of said first chamber.

Said apparatus may further comprise means for regulating the speed of said rod and first piston arrangement, said regulating means comprising;

a second chamber disposed above said first chamber and co-axial therewith, said second chamber being filled with a viscous fluid;
said first rod extending through both said first and second chambers;
a second piston disposed on said first rod in said second chamber;
means for detecting when the upward travel of said rod reaches a predetermined level and for stopping further motion on detection;
the position of the detecting means being adjustable; whereby the effective volume of said first chamber is adjustable.

Said means for forcing said first piston downwardly preferably comprises an air passage into the top end of said first chamber;

said air passage being connected to a source of air under pressure;
whereby, when said source of air under pressure is turned on, said air under pressure emerging from said air passage will force said first piston downwardly.

Said storage horn comprises an inlet end and an outlet end and said storage horn is cylindrical in shape;

and said storage horn may comprise, at the outlet end thereof, a diaphragm on the inner surface of said cylinder which constitutes a guard to prevent meat from falling out of the outlet end of said horn;
said diaphragm comprising a rubber-like material.

Said valve means may comprise;

a first cylinder in communication with said portioning means;
a first valve disposed at one end of said first cylinder adjacent said source; and
a second valve at the other end of said cylinder adjacent said horn.

Said second valve comprising means for closing said valve; said closing means comprising meat product separating means.

Said apparatus preferably further comprises automatic casing closure means, comprising;

a first plate and a second plate disposed adjacent the outlet end of said horn, said first and second plates being interleafable;
facing openings in said first and second plates whereby, when said plates are in an open position, an opening between said plates is formed by said facing openings adjacent said outlet end of said horn;
said second plate being fixedly mounted in a frame, said frame being in slidable engagement with said first plate;
a piston and cylinder arrangement for moving said first plate upwardly and downwardly;
whereby, when said first plate is moved upwardly, said frame slides downwardly against said first plate carrying therewith said second plate to thereby close said opening between said plates and to, simultaneously, close the open end of said casing; and when said first plate is moved downwardly, said frame slides upwardly against said first plate carrying said second plate therewith whereby to open said opening between said plates.

Said apparatus preferably further comprises clamping means for clamping closed an end of the casing after it has been closed, said clamping means comprising;

guide means for guiding a clamp to said end of said casing;

said guide means also providing a travel path for a punch; and an anvil disposed under said end of said casing;

whereby, when said clamp is disposed on said casing and said punch descends on said clamp, the interaction of said punch and anvil on said clamp will cause said clamp to be clamped closed.

BRIEF DESCRIPTION OF THE DRAWINGS

The invention will be better understood by an examination of the following disclosure, together with the accompanying drawings, in which:

FIG. 1 is a somewhat schematic diagram of a system in accordance with the invention;

FIG. 2 is a top view of part of FIG. 1;

FIG. 5 is a detailed sectional view of the casing closure mechanism; and

FIG. 6 is a side view of FIG. 5.

DETAILED DESCRIPTION OF THE DRAWINGS

Figures 3, 4:
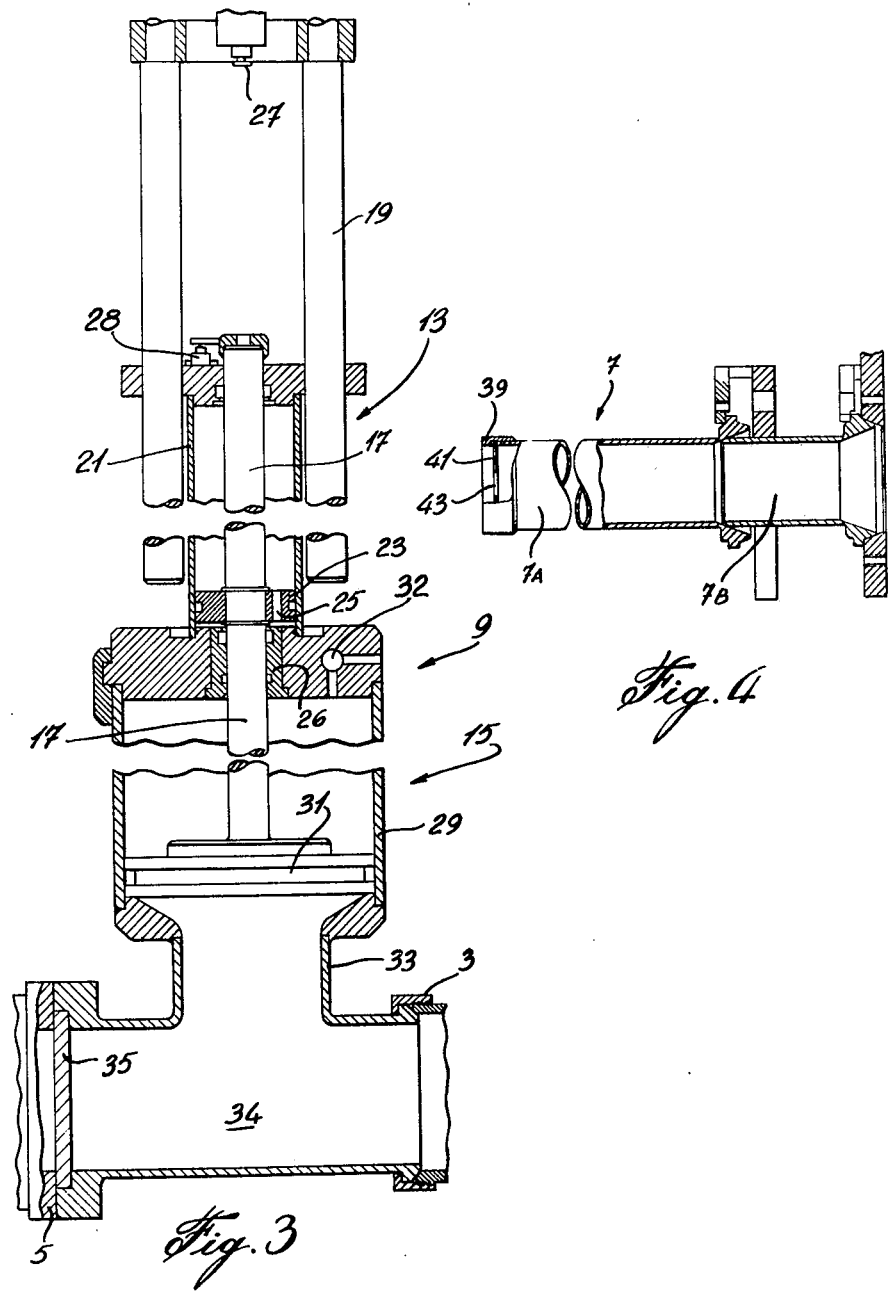
FIG. 3 is a sectional view of the speed control and portioning chambers.
FIG. 4 is a view of the horn with one end in section.

Referring now to FIGS. 1 and 2, a system in accordance with the invention includes a portioning and speed control means 1 having inlet and outlet valves 3 and 5 respectively at the bottom end thereof. The inlet valve is connected to a conventional meat pump. The outlet valve 5 is connected to horn 7 which stores the product between cycles and before packaging as will be described below. Valve 3 includes means for opening and closing to permit or prevent communication therethrough as well known in the art.

The mechanism 9 automatically performs the closure of the casing and clamps it shut, and 11 is a system for moving the mechanism 9 out of the way when a casing is to be put on to the horn.

The apparatus is mounted on a support, such as a table 6, and support column 8 extends from the table to support horn 7.

Referring now to FIG. 3, the portioning and speed control means 1 includes a speed control chamber 13 and a meat portioning chamber 15. Rod 17 extends through both chambers 13 and 15.

The chamber 13 is supported by columns 19 and includes an inner wall 21. The peripheral edge of piston 23 in chamber 13 sealingly and slidingly engages the inner wall 21. Orifice 25 extends through piston 23 to permit communication between the portions of chamber 13 on either side of the piston as the piston moves up and down in the chamber. Rod 17 slidingly and sealingly engages ring 26 which ring prevents communication between chamber 13 and 15.

Chamber 13 is filled with a fluid, preferably a viscous fluid such as oil, for reasons discussed below.

Means 27 comprises an adjustment screw and upper level sensing switch, while lower level sensing switch 28 is disposed on the top surface of chamber 15.

Chamber 15 includes an outer casing 29 surrounding the interior of the chamber. Piston 31 sealingly and slidingly engages the inner wall of the casing 29, and passage 32 is an air inlet passage to permit air into chamber 15 to act on piston 31 to force it in a downwardly direction as well known in the art. Passage 33 is the communications channel between the interior of pipe 34, connected at respective ends thereof to valves 3 and 5, and the interior of chamber 15. Opening 35 in the side of valve 5 permits insertion of a separating means, for example, a knife (not shown) into the interior of the valve 5 to separate the meat in the cylinder 7 from the meat in pipe 34 and, at the same time, to close valve 5.

Turning now to FIG. 4, the outlet end 39 of the horn 7 comprises a rubber-like diaphragm 41 having a central opening 43. The arrangement at the outlet end of the horn 7 will prevent pieces of meat from falling out of the outlet end of the cylinder as will be described below.

It will be seen that, in FIG. 4, the horn consists of two sections; basic section 7A and add-on section 7B. As will be discussed below, the volume of the horn will be equal to the effective volume of the portioning cylinder. As the effective volume of the portioning cylinder is adjustable, the volume of the horn must also be adjustable to conform with the different volumes of the portioning cylinder. One method of making the horn volume adjustable is by providing add-on sections as 7B. The total volume of the horn will conform with standard packaging weights for the product such as, for example, 3 lbs. for the basic section - 4 lbs. with one add-on section and the basic section- etc.

FIGS. 5 and 6 show in greater detail the construction of closure means 9. Upper plate 45 and lower plate 47 are, as best seen in FIG. 6, inter-leafable so that the plates are movable upwardly and downwardly relative to each other. The plates having facing openings to form an opening 46 between the plates when they are in an open position. Piston and cylinder arrangement 49 acts directly on plate 47 to force it upwardly. When plate 47 moves upwardly, frame 50 slides downwardly along plate 47 and against the upward motion thereof. Frame 50 carries plate 45, which is fixedly mounted on the frame, with it in its upward and downward motion, so that the relative distance of travel as between the two plates is equal to the length of the stroke of the piston and cylinder arrangement 49.

When the rod of arrangement 49 has traveled its full length, the plates will be closed and leave an opening 45a, 47a as shown in dotted lines in FIG. 6.

In its downward stroke, the rod of arrangement 49 will carry plate 47 with it. Frame 50 will slide upwardly against the motion of plate 47 carrying plate 45 with it until the plates are in their fully separated position as shown in FIGS. 5 and 6.

The closure mechanism also includes means for providing a clamp at the open end of the casing, and for clamping closed the open end of the casing. The means includes conveyor 51, shown in FIGS. 5 and 6 as a pipe means, for conveying clamps to the mechanism. The clamps are brought to the bottom end of punch 53 which, together with anvil 55, effect the closure of the clamp. Punch 53 is driven by piston and cylinder arrangement 57.

As seen in FIG. 5, casing 59, filled with the product, will extend through the opening 46 between the plates 45 and 47 with the plates in the open position.

Returning now to FIGS. 1 and 2, the means 11 comprise a piston and cylinder arrangement 61 connected to plate 63 on one side of the arrangement 9. Disposed on the other side of the arrangement 9 is a second plate 65, and means are provided for connecting the plates 63 and 65 to opposite sides of the arrangement 9 and to each other so that, when piston and cylinder 61 moves plate 63, it will carry with it plate 65 and arrangement 9. The path defined by the motion of plates 63 and 65 and arrangement 9 is an arc as shown by arrow B in FIG. 2.

In operation, the apparatus works as follows:

When the piston 31 is in its lowermost position, valve 3 is opened so that product can pass therethrough to the interior of pipe 34. Valve 5 is closed at this time, and plates 45 and 47 are in their open position. Casing 58 is mounted over the horn 7 as shown in FIG. 1. As can be seen in FIG. 1, the left-hand end of the casing 58 is clamped closed.

When meat is supplied under pressure to the inlet valve 3, as the valve 5 is closed, the only path available for the meat is up through passage 33 into the interior of chamber 15. In moving into chamber 15, the meat will force piston 31 to move in an upward direction, at the same time forcing rod 17 and piston 23 to move in an upward direction.

The rate at which piston 23 can move upwardly is a function of the rate at which the liquid above the piston can flow into the evacuated chamber below the piston through the orifice 25. The specific speed will be a function of the viscosity of the liquid and the size of the orifice, and this is, of course, pre-set as desired. However, whatever the preset speed, the novel arrangement, because the orifice is fixed and the liquid content is fixed, insures that the arrangement consisting of the rod 17 and the pistons 23 and 31 will move at a constant speed.

As will be appreciated, the speed of the downward movement of the rod 17 and pistons 23 and 31 arrangement will be regulated in the same way.

The rod 17 will continue in its upward movement, forced by meat coming into the chamber 15, until the top of rod 17 makes contact with means 27. This contact will actuate the switch in 27 which will cause valve 3 to close thus preventing any more meat from being fed from the pump into the pipe 34 and into the chamber 15. The height of 27 is adjusted such that, when the rod makes contact with 27, the chamber 15, under the piston 31, will contain a desired, predetermined volume, and therefore weight, of meat. Thus, an acurate portion of meat is taken into the chamber 15 on each upward stroke of the rod 17 and piston 31 arrangement. To change the volume, and thereby the weight, it is merely necessary to adjust the height of the means 27.

When the switch in 27 is contacted, the valve 5 will be opened so that the product can pass through the valve into the horn 7. To effect this meat movement, air under pressure is supplied to air passage 32 from a source (not shown), and the air under pressure, applied at the top surface of 31, will force 31 downwardly pushing the meat product ahead of it. We will now assume that we are in at least the second cycle of operation so that the horn will be filled with a portioned amount of the product. As meat coming out of chamber 15 begins to fill the horn 7 from the right hand end thereof, meat already in the horn will emerge from the left hand end of the horn.

The meat emerging from the horn will fill casing 58 and, as the casing is closed at the left hand end, it will push the casing off the horn ahead of the emerging meat. The meat emerging from the output end of the horn will force diaphragm 41 open to increase the size of opening 43.

This motion will continue until piston 31 reaches its most downwardly position at which time chamber 15 is completely evacuated of its meat product. At the same time, piston 23 will reach its most downwardly position and switch 28 will be contacted to activate the switch.

When switch 28 is activated, the source of air under pressure is shut off so that no more air is provided to passage 32. Valve 5 is now closed. As above mentioned, valve 5 includes an opening 35 to receive a separating means such as a knife to close the valve. At the same time, the means will separate the meat in the horn 7 from meat in pipe 34. The meat to the left of the knife, in horn 7, will constitute the end of one portion, and the meat in pipe 34 to the right of the knife will constitute the beginning of the next portion. Thus, it will be seen that sequential portions are clearly and physically separated. The right hand end of the portion of meat which has emerged from the horn into the casing will also have been separated from the left hand end of the portion of meat still in the horn, so that there is no difficulty in clamping closed the right hand, open, end of the casing 58 in the space between portions.

When the meat is no longer being forced out of the outlet end of the horn, there will be no force acting on the diaphragm 41, so that the diaphragm will stand up in the position as shown in FIG. 4. The diaphragm will then form a guard around the edge of the inner surface at the outlet end of horn 7 and prevent loose pieces of meat from falling out of this outlet end.

Activation of switch 28 is followed by activation of piston and cylinder arrangement 49 to move plates 45 and 47 into their closed position. When the plates move together, they will capture the right hand end of the casing and force it closed. The complete closure of the plates are detected as, for example, by activation of switch 52 by piston 48, and this will cause a clamp to be released through 51 into the space below the bottom end of punch 53. The clamp is then guided onto the casing and piston and cylinder arrangement 57 is then activated to force punch 53 downwardly along the guide path of the clamp. Anvil 55, which has moved upwardly with plate 47, is so shaped that, when the punch pushes the clamp, which is u-shaped, against the anvil, it will force the legs of the clamp to move towards each other, whereby the clamp will be clamped closed about the end of the casing in much the same way as a stapling machine closes a staple.

While the casing is being filled, and during the closure operation, the filled casing will, as will be appreciated, be supported by the tray 10.

After the closure operation, piston and cylinder arrangement 61 will be actuated to swing the arrangement 9 away from the outlet end of the horn 7. At this time, if any casing was still wrapped around the outlet end of the horn, it will be pulled off so that the casing will be completely free of the horn. However, the end of the casing will still be held by plates 45 and 47.

A switch or lever is provided to activate piston and cylinder arrangement 61 to move in the opposite direction and to thereby swing arrangement 9 back into the position shown in FIGS. 1 and 2. Before arrangement 9 returns to this position, piston and cylinder arrangement 49 is activated to move piston 48 to its downward position, thereby separating plates 45 and 47. As the plates open up, casing 59 will be freed and it will then either fall off of or be manually removed from the tray 10.

When arrangement 9 is returned to the position of FIGS. 1 and 2, valve 3 is once again open so that, with valve 5 closed and piston 31 in its most downwardly position, a new cycle is ready to start.

Arrangements for actuating piston and cylinder arrangements, or the like, on receipt of a detection signal from, for example, a switch, are well known and thus do not constitute inventive elements of this system, nor do they require fuller illustration or description herein.

As can be seen, the inventive apparatus provides accurate and consistent separated portions in automatically closed and clamped casings. The filling rate is regulated by speed control means, and means are provided for preventing meat from falling out of the outlet end of the horn. Thus, the inventive apparatus is consistently accurate, efficient and preventive of waste.

Although a specific embodiment has been described, this was for the purpose of illustrating, but not limiting, the invention. Various modifications, which will come readily to the mind of one skilled in the art, are within the scope of the invention as defined in the appended claims.

I claim:

1. Apparatus for automatically providing a predetermined portion of a meat product, received from a source, in a casing, comprising;

a portioning means;

a storage horn;

valve means for passing said product from said source to said portioning means, and, subsequently, from said portioning means to said horn;

characterized in that said valve means comprises three ports;

a first one of said ports being in communication with said source;

a second one of said ports being in communication with said portioning means; and a third one of said ports being in communication with said storage horn;

means for closing said first port and said third port such that, when said first port is open, said third port is closed, and when said third port is open, said first port is closed;

whereby, when said first port is open and said third port is closed, meat arriving from the source will be forced into said portioning means, and when said third port is open and said first port is closed, meat from said portioning means will be forced into said storage horn.

2. Apparatus as defined in claim 1 wherein said portioning means comprises;

a first chamber with an adjustable effective volume;

a rod and first piston arrangement in said chamber said first piston being pushed upwardly by meat entering said chamber; and means for forcing said first piston downwardly when said effective volume of said first chamber is filled with said meat product to thereby force said meat product out of said first chamber.

3. Apparatus as defined in claim 2 and further comprising means for regulating the speed of said rod and first piston arrangement, said regulating means comprising;

a second chamber disposed above said first chamber and co-axial therewith, said second chamber being filled with a viscous fluid;

said first rod extending through both said first and second chambers;

a second piston, having an orifice therethrough, disposed on said first rod in said second chamber;

means for detecting when the upward travel of said rod reaches a predetermined level and for stopping further motion on detection;

the position of the detecting means being adjustable; whereby the effective volume of said first chamber is adjustable.

4. Apparatus as defined in claim 3 wherein said means for forcing said first piston downwardly comprises an air passage into the top end of said first chamber;

said air passage being connected to a source of air under pressure;

whereby, when said source of air under pressure is turned on, said air under pressure emerging from said air passage will force said first piston downwardly.

5. Apparatus as defined in claim 1 or 4 wherein said storage horn comprises an inlet end and an outlet end and wherein said storage horn is cylindrical in shape;

said storage horn comprising, at the outlet end thereof, a diaphragm on the inner surface of said cylinder which constitutes a guard to prevent meat from falling out of the outlet end of said horn;

6. Apparatus as defined in claim 1 wherein said means for closing said third port comprises meat product separating means.

7. Apparatus for automatically providing a predetermined portion of a meat product, received from a source, in a casing, comprising;

a portioning means;

a storage horn;

valve means for passing said product from said source to said portioning means, and, subsequently, from said portioning means to said horn;

said portioning means comprising;

a first chamber with an adjustable effective volume;

a rod and first piston arrangement in said chamber said first piston being pushed upwardly by meat entering said chamber; and means for forcing said first piston downwardly when said effective volume of said first chamber is filled with said meat product to thereby force said meat product out of said first chamber;

said storage horn comprising an inlet end and an outlet end and said storage horn being cylindrical in shape;

said storage horn comprising, at the outlet end thereof, a diaphragm on the inner surface of said cylinder which constitutes a guard to prevent meat from falling out of the outlet end of said horn;

said diaphragm comprising a rubber-like material;

said valve means comprising;

a first cylinder in communication with said portioning means;

a first valve disposed at one end of said first cylinder adjacent said source; and a second valve at the other end of said cylinder adjacent said horn;

said second valve comprising means for closing said valve; said closing means comprising meat product separating means;

and further comprising means for regulating the speed of said rod and first piston arrangement, said regulating means comprising;

a second chamber disposed above said first chamber and co-axial therewith, said second chamber being filled with a viscous fluid;

said first rod extending through both said first and second chambers;

a second piston, having an orifice therethrough, disposed on said first rod in said second chamber;

means for detecting when the upward travel of said rod reaches a predetermined level and for stopping further motion on detection;

the position of the detecting means being adjustable;

whereby the effective volume of said first chamber is adjustable.

8. Apparatus as defined in claim 7 wherein said means for forcing said first piston downwardly comprises an air passage into the top end of said first chamber;

said air passage being connected to a source of air under pressure;

whereby, when said source of air under pressure is turned on, said air under pressure emerging from said air passage will force said first piston downwardly.

* * * * *